Sept. 15, 1953

H. M. ROCKWELL 2,652,078

WHEEL SUPPORT WITH A CIRCUMFERENTIALLY
AND AXIALLY MOVABLE TOOLHOLDER

Filed Aug. 27, 1948

INVENTOR
Hugh M. Rockwell
BY
Arthur Wright
ATTORNEY

Sept. 15, 1953    H. M. ROCKWELL    2,652,078
WHEEL SUPPORT WITH A CIRCUMFERENTIALLY
AND AXIALLY MOVABLE TOOLHOLDER
Filed Aug. 27, 1948    7 Sheets-Sheet 2

Fig. 3.

INVENTOR
Hugh M. Rockwell
BY
Arthur Wright
ATTORNEY

Sept. 15, 1953     H. M. ROCKWELL     2,652,078
WHEEL SUPPORT WITH A CIRCUMFERENTIALLY
AND AXIALLY MOVABLE TOOLHOLDER
Filed Aug. 27, 1948     7 Sheets-Sheet 4

INVENTOR
Hugh M. Rockwell
BY
Arthur Wright
ATTORNEY

Sept. 15, 1953   H. M. ROCKWELL   2,652,078
WHEEL SUPPORT WITH A CIRCUMFERENTIALLY
AND AXIALLY MOVABLE TOOLHOLDER
Filed Aug. 27, 1948   7 Sheets-Sheet 5

INVENTOR
*Hugh M. Rockwell*
BY
*Arthur Wright*
ATTORNEY

Sept. 15, 1953 H. M. ROCKWELL 2,652,078
WHEEL SUPPORT WITH A CIRCUMFERENTIALLY
AND AXIALLY MOVABLE TOOLHOLDER
Filed Aug. 27, 1948 7 Sheets-Sheet 6

INVENTOR
Hugh M. Rockwell
BY
Arthur Wright
ATTORNEY

Patented Sept. 15, 1953

2,652,078

UNITED STATES PATENT OFFICE 2,652,078

WHEEL SUPPORT WITH A CIRCUMFERENTIALLY AND AXIALLY MOVABLE TOOL-HOLDER

Hugh M. Rockwell, Freeport, N. Y.

Application August 27, 1948, Serial No. 46,445

2 Claims. (Cl. 144—288)

My invention relates particularly to an apparatus for mounting and demounting tires of all kinds, such, for instance, as tires used on automotive and aircraft wheels.

The present invention is an improvement upon the subject matter of my copending applications Ser. No. 633,698, now Patent No. 2,547,976 issued April 10, 1951, upon Tire Mounting and Demounting Machine of the Type Having Relative Travel Between a Tire and a Tire Tool, filed December 8, 1945, and Ser. No. 758,598, upon Tire Mounting and Demounting Apparatus and Tool for Use Therewith, filed July 2, 1947.

One of the objects of my invention is to provide an improved machine for carrying out the operations of mounting and demounting automotive and aircraft tires. Another object is to provide an all-purpose machine which can be operated on automotive as well as aircraft tires. Another object is to provide a more effective and simpler machine for carrying out the relative movement of a tool for manipulating the tire with regard to a wheel, while the wheel is being effectively held against movement in relation to the tool. A further object is to provide a mechanism of this character constructed to apply an "on and off" tool which may be used for removing the tire from, as well as mounting the tire on, the wheel, the machine being, furthermore, constructed so as to provide a means for manipulating effectively this or any other type of tool provided for this purpose, as for example a stripper tool. Another important object of my invention is to provide means, such as a drive-bar, for operating the said tool while rotating the latter with regard to the wheel which is being held from relative rotative movement and while at the same time enabling the distance between the operative end of the tool and the wheel to be adjusted and controlled at will. Still another purpose is to provide friction means for effectively controlling the change in said distance from time to time while the tire is being mounted on or demounted from the wheel. A further object is to provide a drive-bar for rotatably advancing the tool, the elevation of which drive-bar may be readily adjusted from time to time, and the distance between the tool and the wheel rim changed, during the mounting or demounting of the tire on the wheel rim. Again, a further object is to provide an effective means for supplying a lubricant, which is constantly fed to the face of the tool where it contacts with the surface of the tire. Another object is to provide an effective shape for the working end or face of the "on and off" tool. A further object is to provide an effective clamp to hold a removable flange of the wheel rim in place while breaking the bead of the tire away from its position on the wheel rim. An object of my invention, also, is to provide means for breaking the accumulated rust away from the periphery of the wheel rim. Still a further object is to provide an effective friction means for holding the wheel from rotation while rotatably applying the tool or tools for mounting or demounting the tire therefrom. Further objects of my invention will appear from the detailed description of the same hereinafter.

While my invention is capable of embodiment in many different forms, for the purpose of illustration I have shown only certain embodiments thereof in the accompanying drawings, in which—

Figures 1, 2:
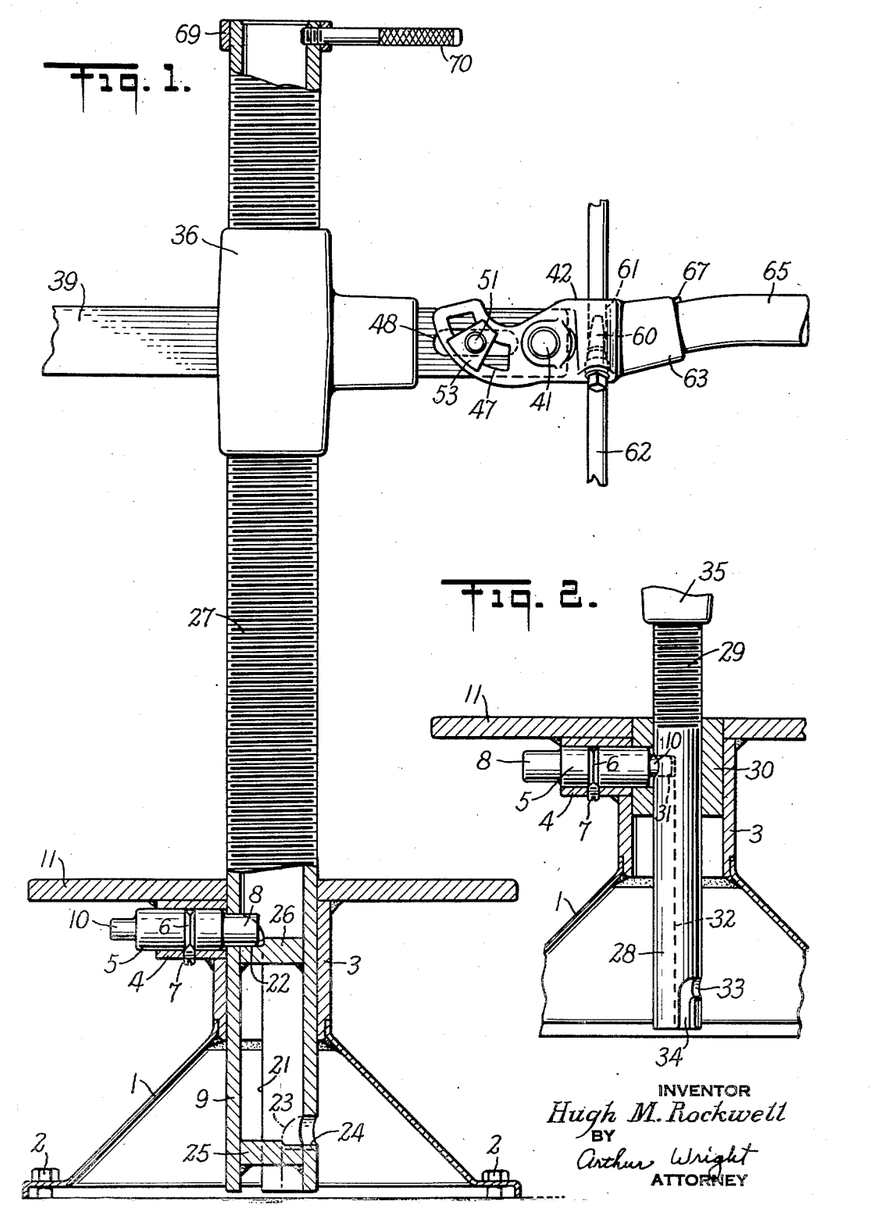
Fig. 1 is a vertical section of a single-purpose machine made in accordance with my invention, designed for mounting and demounting automotive and aircraft tires.
Fig. 2 is a similar view of a modification of my invention, designed for operating particularly on aircraft tires.
Figure 3:
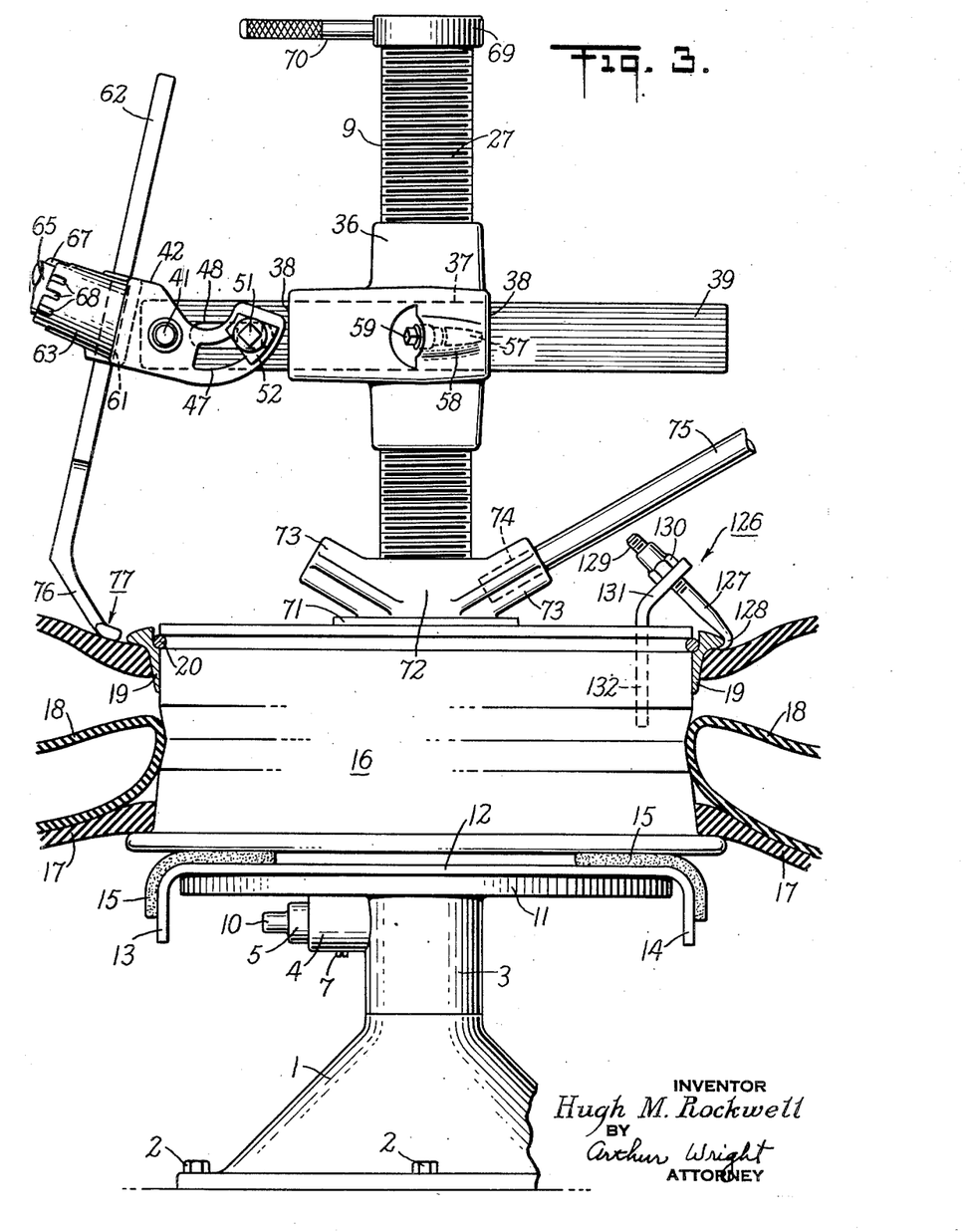
Fig. 3 is a side elevation of the machine in Fig. 1, showing the friction plate for preventing the rotation of the wheel while the rotatable tool is being applied thereto and showing a form of rim clamp for removable-flange wheels.
Figure 4:
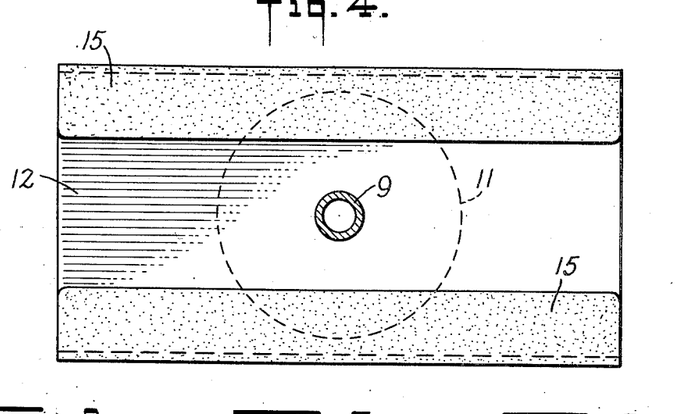
Fig. 4 is a plan view of the friction plate shown in Fig. 3.
Figure 5:
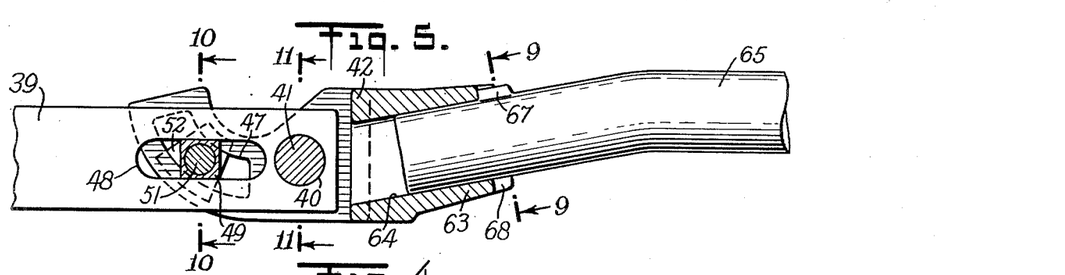
Fig. 5 is an elevation, enlarged, showing the end of the drive-bar received in said socket.
Figure 6:
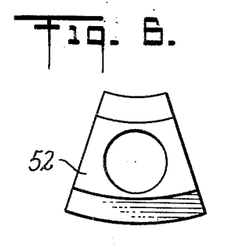
Fig. 6 is a side elevation of a drilled tapered friction block carried by the slotted sector of the tool holder.
Figure 7:
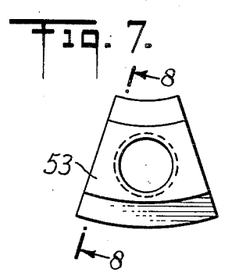
Fig. 7 is a side elevation of a screw-threaded tapered friction block carried by the slotted sector of the tool holder.
Figure 8:
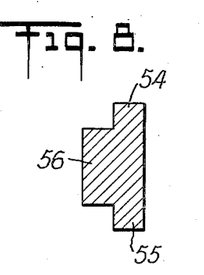
Fig. 8 is an end elevation showing the narrow end view of the friction blocks of Figs. 6 and 7 taken on line 8—8 of Fig. 7.
Figure 9:
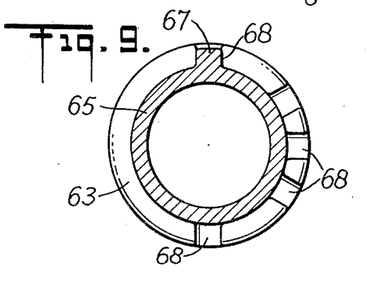
Fig. 9 is an end view, enlarged, showing the end of the rotatable tool holder, taken on line 9—9 of Fig. 5.
Figure 10:
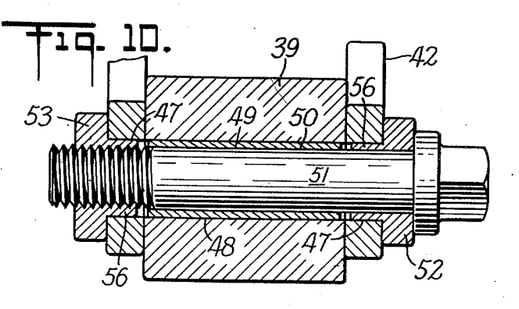
Fig. 10 is a section taken on line 10—10 of Fig. 5.

In the drawings, referring to Fig. 1, etc., I have shown a conical base 1 which may be secured by screws 2 to the floor, or other supporting surface. The base 1 has, welded into the upper portion thereof, a recessed lower end of a housing 3 which has welded thereto a cylindrical socket 4 for receiving laterally through the same a removable cylindrical pin 5 having a tapered annular recess 6 for receiving a screw 7, with a pointed end, through one side of the socket 4. It will be noted that the cylindrical pin 5 has a smaller cylindrical pin 8 at one end, which projects through the side of a screw-threaded tubular arbor 9. The other end of the pin 5 has a still smaller cylindrical pin 10 for projecting into a smaller size arbor to take the place of the arbor 9, when desired, as illustrated in Fig. 2. Welded to the top of the housing 3 there is a circular plate 11 which is arranged to receive a pad-supporting plate 12 having depending flanges 13 and 14 bent over the ends of the plate 11. The plate 12 may be secured to the plate 11 by any additional fastening means, as desired. The said plate 12 has secured over the top and sides rectangularly a pair of rubber friction pads 15, vulcanized to the plate 12, for supporting a wheel rim 16 carrying a tire 17, provided with the usual pneumatic inner tube 18. While the apparatus in Fig. 1, as well as in Fig. 2, is designed for the mounting and demounting of such tires on any desired type of wheel rim, one type thereof, such as shown in Fig. 3, may be provided with a detachable rim flange 19 held in place by a split snap ring 20.

The arbor 9 is provided with a vertical bayonet slot 21 having a horizontal bayonet lock portion 22 at the upper end thereof with a terminal lower recess therein, so that the arbor 9 can be pressed downwardly over the pin 8 and then rotated to move the said recess of the horizontal slot 22 onto the pin 8. The lower end of the arbor 9 is also provided with a similar short vertical bayonet slot 23 having a horizontal bayonet lock portion 24 with a terminal lower recess therein, at the upper end thereof which can, in a similar manner, be applied to register with the pin 8, instead of the slots 21 and 22, when a greater elevation is desired for the arbor 9. At the lower end of the arbor 9 there is a cylindrical plug 25 welded in place to strengthen the lower end of the arbor 9 where the horizontal slot 24 is located. Also, there is a similar cylindrical plug 26 welded at a higher level in the arbor 9 to strengthen the arbor 9 at the point where the horizontal slot 22 is located. The upper portion of the arbor 9 has an external screw-thread 27.

Fig. 2 shows a modified form of the apparatus just described, which, however, is constructed the same as in the case of Fig. 1 except that in the form shown in Fig. 2 an arbor 28 of smaller diameter, having a screw-thread 29, is used for aircraft wheels which have a smaller hole through the axial portion thereof. In this instance the arbor 28 is located on pin 5 in a bushing 30 which is within the housing 3 and plate 11, and the arbor 28 is provided with a small horizontally directed slot 31 to receive the small sized pin 10, the horizontal slot 31, with a terminal lower recess, being connected to a vertical slot 32, as in the case of Fig. 1. The said arbor 28 may also have a horizontal slot 33, with a terminal lower recess, connected to a vertical slot 34, as in Fig. 1. The apparatus for supporting and operating the tools used in connection with Fig. 2 are the same as described in connection with Fig. 1, etc., it being understood that there is applied to the arbor screw-thread 29 of Fig. 2 a small diameter nut 35 for supporting a tool, which is screw-threaded onto the arbor 28, as compared to a larger diameter nut 36 for this purpose shown in Fig. 1.

Referring, again, to the embodiment shown in Fig. 1, etc., the nut 36, which is screw-threaded onto the arbor 9, has a transverse slot 37 with opposing holes 38 to receive a tool holder support 39 rectangular in cross-section so that the said support is slidable horizontally in the slot 37. The end of the tool holder support 39 has a hole 40 to receive a pivot pin 41 which passes through and slightly beyond the sides of a tool holder 42 so that the tool holder may be pivotally adjusted manually in a vertical direction as it is used in operating on a wheel in the machine. Split rings 43 and 44 are received in recesses 45 and 46, respectively, on the ends of the pin 41 to hold the same in place. An inner bifurcated end of the tool holder 42 has curved slots 47, the ends of which have different radial distances from the pivot 41 so as to provide an effective frictional binding contact between the tool holder 42 and the tool holder support 39 so as to tend to retain the tool holder 42 in adjusted position until it is desired to change the position of the tool carried thereby. For this purpose the tool holder support 39 has a horizontal slot 48 to receive a squared guide block 49 having a transverse opening 50 which receives an adjusting screw 51 passing through tapered drilled block 52 and having a screw-threaded end threaded into a tapered screw-threaded block 53, which has outer flanges 54 and 55 arranged to be located adjacent to the face of the holder 42 and an inner boss 56 arranged to project into the slot 47. By adjusting the screw 51 the frictional engagement between the tool holder 42 and the tool holder support 49 can be adjusted and maintained by the tapered friction blocks 52 and 53 together thereby, when desired.

The tool holder support 39 is held in any desired position of adjustment by a clamping wedge 57 constructed exactly like the wedging clamp in my copending application Ser. No. 758,598 aforesaid, although any other type of clamp can be used, for this purpose, as desired. The wedge-shaped clamp is movable in a cylindrical bore 58 by a rotatable boss 59, with a squared outer end, having an inner channelled end rotatably engaging a channelled inner end of the clamping wedge 57 for movement back and forth therewith. Also, the tool holder 42 has a clamping wedge 60 constructed and operated just like the wedge 57 to hold in fixed adjusted position, in a flanged slot 61, like the slot 37, a tool such, for instance, as a stripping tool 62.

On the end of the tool holder 42 there is a socket 63, having a cylindrical recess 64, to receive a drive-bar 65 provided with an inner bent end having a tooth 67 which can be engaged in any one of a series of notches 68 in the outer end of the socket 63. By shifting the position of the tooth 67 in the series of notches 68, the elevation of the outer end of the drive-bar 65 can be changed at will. On the upper end of the screw-thread 27 there may be provided a removable screw-threaded cap 69 having an operating handle 70, to act as a stop limiting any undue degree of upward movement of the tool holder support 39. Also, the screw-threaded arbor 9 carries, above the wheel rim 16, a removable cone 71 of any desired size, of which there may be provided several different sizes for different wheels, which is forced downwardly by a nut 72 on the screw-thread 27, said nut having one or more arms 73 with sockets 74 to receive a bar 75 for manually adjusting the position of the nut 72, to clamp the wheel 16 against rotation on the rubber friction pad 15.

As above indicated, any desired type of tool can be carried in the holder 42, such for example as the stripping tool 62, which has an inwardly inclined portion 76 to clear the edge of the wheel rim and cut out at the side to clear the flanges of the slot 61 when the tool is being inserted in or removed from the tool holder 42. The stripping tool 62 also has a toe portion 77, with a narrow curved leading edge 78, a wider rear curved follower portion 79 and a substantially flat face 80 provided with curved margins. In a socket in the said flat face 80 there is brazed a plug 81 of hard tool steel, stellite, carborundum or diamond, said plug being substantially square but having dulled edges on all sides. This plug 81 extends only slightly, generally about $\frac{1}{32}''$, above the face 80 of the tool 62 and is provided for the purpose of being advanced helically against the periphery of the wheel 16 in order to break the rust, which may have accumulated on the periphery of the wheel rim 16 if made of steel. This stripping tool 62, or any other tool that may be desired to be used in this machine, furthermore, can be provided with effective means for constantly lubricating the tire surface which is in contact with the tool by providing a narrow inclined discharge passage 82 leading inwardly to a larger central longitudinal passage 83 which is connected with a reservoir 84 of soapy water, or other lubricant, by means of an apertured plug 85 screw-threaded into the top of the passage 83 and having a hexagonal flange nut 86 formed thereon and screw-threaded into the lower end of the reservoir 84. An upper end of the plug 85 also acts as a valve seat 87 for a needle valve 88 on a rod 89 having a handle 90 screw-threaded into a spider 91 carried in the top of the reservoir.

Figure 20:
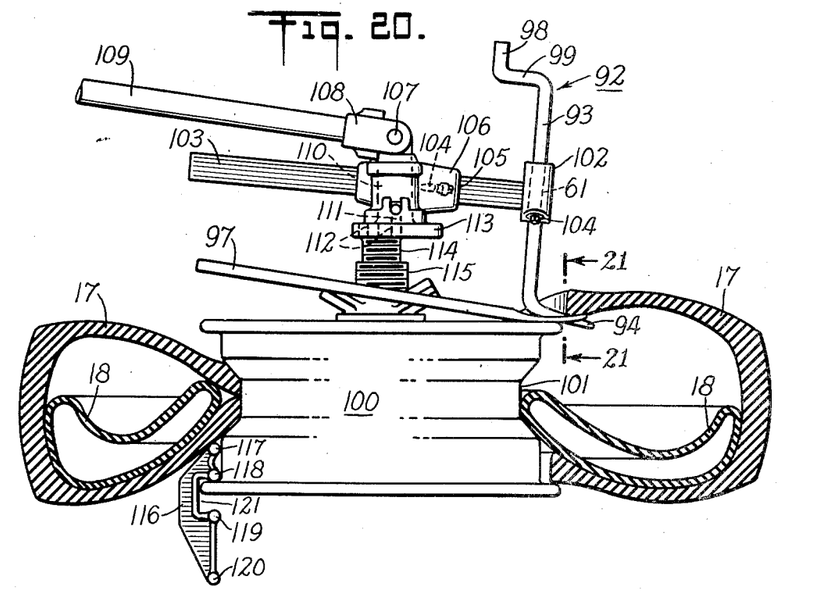
Fig. 20 is a side elevation of an "on and off" tool which may be used in the machines illustrated in Figs. 1 and 2.
Figures 21, 22:
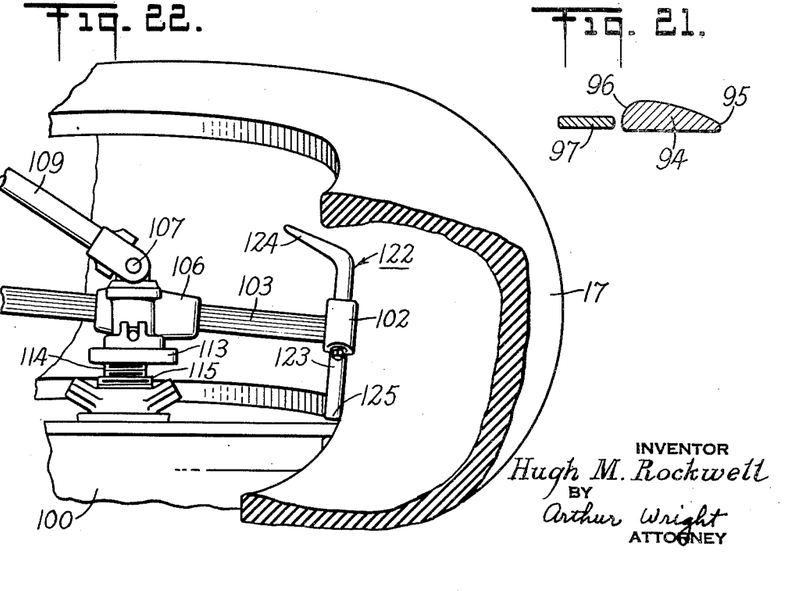
Fig. 21 is a cross-section of the tool shown in Fig. 20, taken on lines 21—21 thereof.
Fig. 22 is a detail showing a side elevation of a modified form of "on and off" tool.

It will be understood, however, that instead of the stripping tool 62 there may be carried in the holder 42 any different kind of tool, as desired. For instance, in operating on a drop center rim, such as shown in Fig. 20, an "on and off" tool 92 having a flat vertical portion 93 to be clamped in the slot 61, or any other suitable support, may be used. This "on and off" tool 92 may have an "off" angular portion 94 provided, as shown in Fig. 21, with a lateral narrow leading edge 95 to be advanced underneath the bead of the tire, as shown in Fig. 20, and a wider edge 96 for cooperating with a tire iron 97, which may be used in connection with the tool 93 in any desired position thereof. See Figs. 20 and 21. The said tool 94 may also have, at the other end, an "on" portion 98 substantially parallel to the portion 93 and a right angle portion 99 connecting the parallel portions 98 and 93. When mounting the tire 17 on the wheel the "on" portion 98 will be directed downwardly in the machine to contact with the inner face of the tire bead. This is useful particularly when mounting the tire upon a drop center wheel rim 100 having a central well 101. As shown in Fig. 20, furthermore, and described in detail in my application Ser. No. 758,598 aforesaid, the "on and off" tool 92 may be held in a slotted end 102 of a support 103 by a wedging clamp 104, like the wedging clamp 57, the support 103 being, in like manner, held by a wedging clamp of the same kind as the clamp 104, in an offset opening 105 in a tool holder support 106, provided with a pivot 107 to receive a bifurcated end 108 of a drive-bar 109. The tool holder support 106 is rotatably mounted on a crank pin or boss 110 and has a locking pin 111 which may engage with one or more vertical holes 112 around the periphery of a circular plate 113. The boss 110 is integral with the circular plate 113, which is secured in eccentric relation to a screw 114 screw-threaded into an internally and externally screw-threaded sleeve 115, otherwise constructed like the arbor 9 or the arbor in the said application Ser. No. 758,598. It should be understood, also, that as shown in Fig. 20, when operating on the drop center wheel rim 100 a bead supporting block 116 may be used, constructed as disclosed in detail in my application Ser. No. 633,698 aforesaid, and which has cylindrical bead supporting bosses 117, 118, 119 and 120, which may serve as handles, as well as an intermediate recess 121 for receiving the edge of the wheel rim.

Instead of the tools previously referred to there may be used, if desired, a different kind of "on and off" tool 122, as shown in Fig. 22. This comprises an intermediate portion 123 to be received in the slotted end 102, and "off" portion 124 constructed like the "off" portion 94 previously described, and an "on" portion 125 which is substantially vertical when carried in the machine and which can have a cylindrical outer surface or any other shape, as desired.

Figures 11, 12, 13:
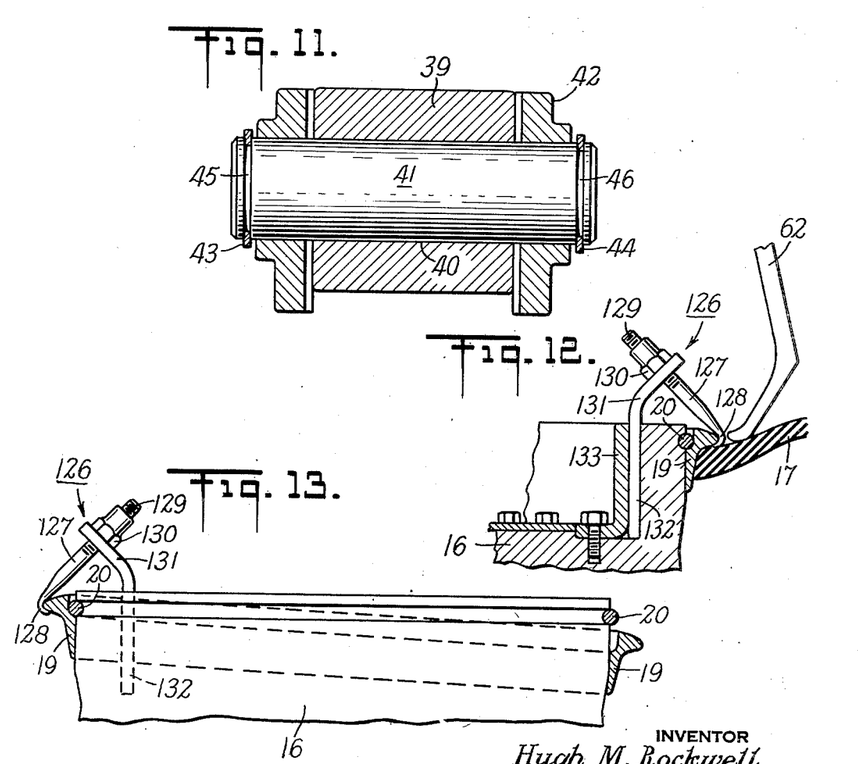
Fig. 11 is a section taken on line 11—11 of Fig. 5.
Fig. 12 is an enlarged detail showing the rim clamp illustrated in Fig. 3.
Fig. 13 is a side elevation showing the said clamp in operation holding the rim of Figs. 3 and 12.
Figures 14, 15:
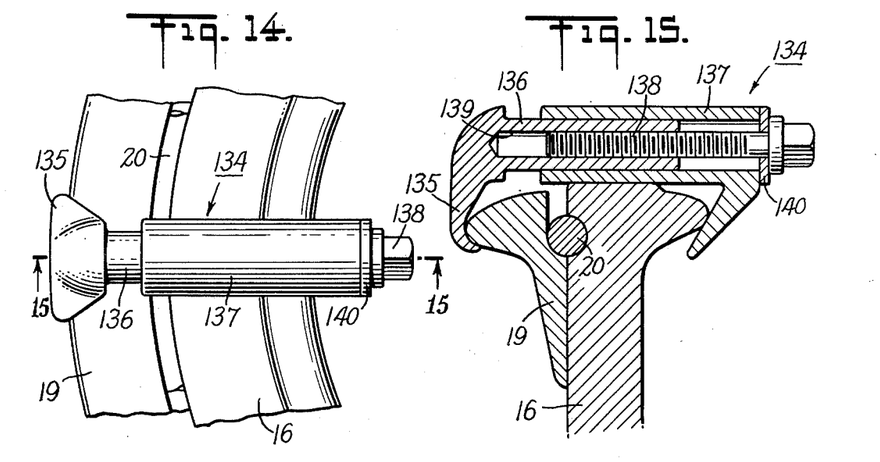
Fig. 14 is a plan view showing a modified form of rim clamp.
Fig. 15 is a longitudinal section through the clamp shown in Fig. 14, taken on line 15—15.
Figure 16:
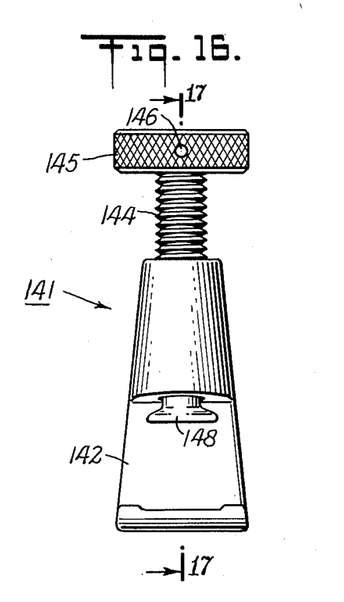
Fig. 16 is a plan view of another modified form of rim clamp.
Figure 17:
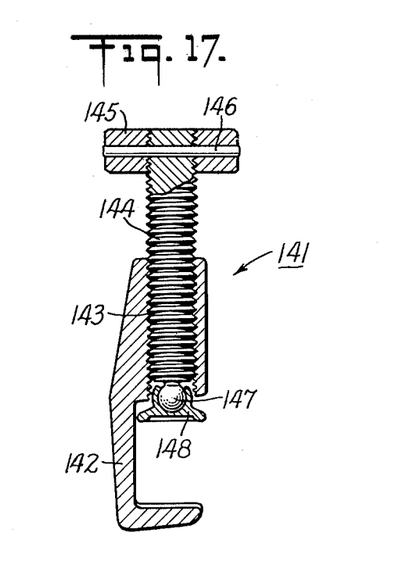
Fig. 17 is a longitudinal section through the rim clamp shown in Fig. 16, taken on line 17—17 of Fig. 16.
Figure 18:
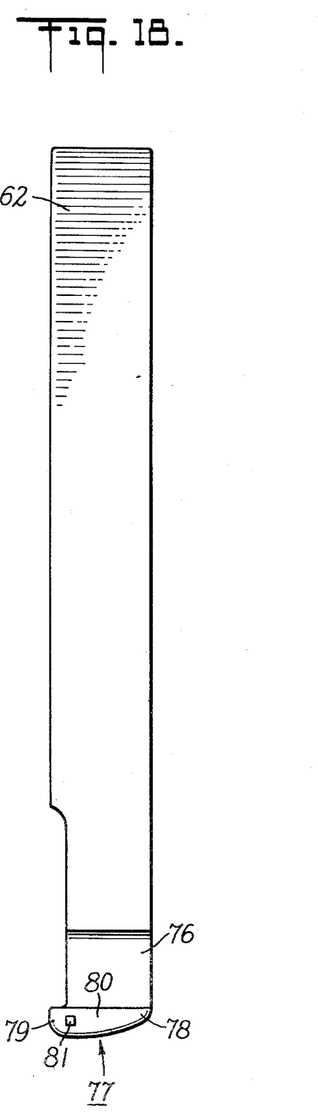
Fig. 18 is a side elevation of a stripper tool, having means therein such for instance as a plug located in a working face at the end of the tool for breaking the rust from the wheel rim.
Figure 19:
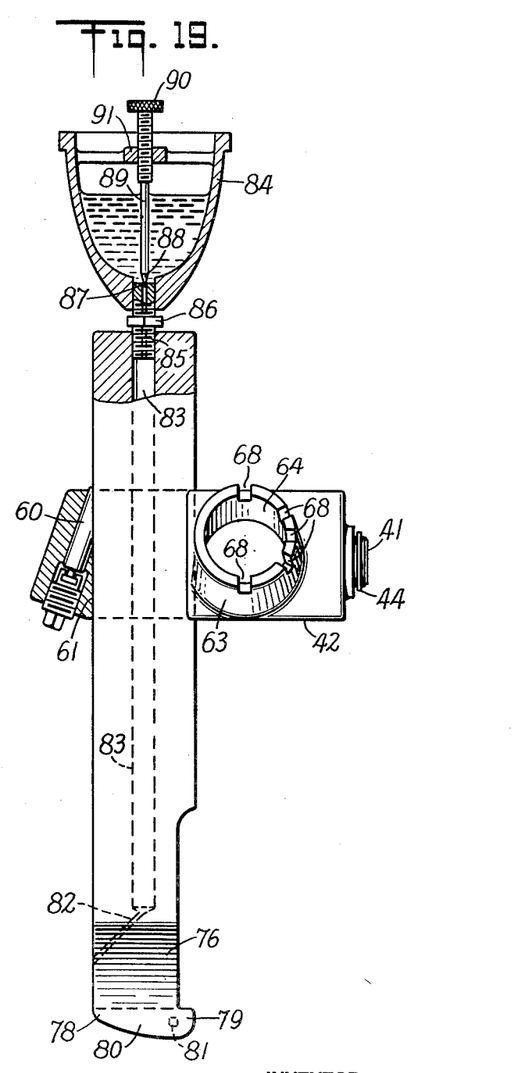
Fig. 19 is a vertical section of a modified form of stripper tool showing means for feeding a lubricant to the working face thereof.

When operating on a wheel rim such as the wheel 16 shown in Fig. 3, having a detachable flange 19, it is desirable to clamp the flange 19 against the rim of the wheel 16 to prevent the flange 19 following the tire 17 while breaking the bead of the tire 17 away from its normal position, in which it may have become tightly secured due to rust, etc. For this purpose, I prefer to apply over the detachable flange 19 a clamp 126, as shown more particularly in Fig. 12, comprising a straight rod 127 having a widened hook 128 at its lower end to be received over the outer edge of the detachable flange 19 and having a screw-threaded inner end 129 carrying one or more lock nuts 130 to hold in place a bent clamping member or jaw 131, a downwardly directed straight flat end 132 of which is arranged to be positioned between the inner periphery of the wheel rim 16 and a brake drum 133. It is sufficient to have merely one clamp for this purpose, as when the demountable flange 19 is held at one place the remainder of said demountable flange 19 will move downwardly and cock itself against the wheel rim 16 as shown in Fig. 13. As shown in Fig. 13, the rim 19, at one side, will cramp downwardly when held at the other side by the clamp member 126. Instead of the clamp just described, a different type of clamp 134, may be used, such as that shown in Figs. 14 and 15. This comprises an outer widened inwardly curved clamping jaw 135 having a sleeve member 136 to be received in an inner jaw 137 and fastened therein in any desired adjusted position by means of a screw 138 passing through the clamping member 134 and into a screw-threaded socket 139. A washer 140 may be provided between the screw 138 and the clamping member 137. If desired, another type of clamp 141 may be provided for this purpose, as shown in Figs. 16 and 17, the same comprising a clamping jaw 142 having a screw-threaded socket 143 to receive a screw 144 provided with a handle 145 secured thereto by a transverse pin 146. On the end of the screw 144 there is a ball joint 147 received in a rotatable clamping head 148.

In the operation of my invention, a wheel 16 carrying a tire 17 is placed over the friction pad 15, the cap 69, cone 71, nut 72 and nut 36, with the attached parts including the tool 62 having been previously removed. The wheel 16 is then clamped tightly against the friction pad 15 by applying the cone 71 and then the nut 72 with the arbor 9 or 28 and the nut 36, with the aid of the manually operated rod 75. The nut 36 is thus applied to the arbor 9, carrying, for instance, a stripping tool 62 in the tool holder 42 and the drive-bar 65, with the tooth 67 being located in the particular peripheral notch to give the most convenient elevation to the end of the drive-bar 65 for rotating the nut 36 clockwise on the arbor 9 or 28. The cap 69 is always maintained screwed in place. Also, the lateral position of the tool can be changed by adjusting the tool holder support 39 and tightly holding the same in place with the wedging clamp 57, and the vertical position of the tool 62 will be adjusted by adjusting the wedge clamp 60 thereon. Furthermore, the degree of frictional engagement of the tool holder 42 with the tool holder support 39 is adjusted by means of the screw 51 so as to require an appreciable manual effort in changing the angular position of the stripping tool 62 while rotating the same clockwise. The stripping tool 62 is then carried downwardly against the upper face of the tire 17 by the rotation of the nut 36 clockwise on the arbor 9, this being accomplished by means of the drive-bar 65, while causing the toe 77 or working face of the tool 62 to follow the outer surface of the wheel rim 16 by gradually changing the angle of the tool holder 42 to the tool holder support 39, and moving the toe 77 inwardly and outwardly until the bead of the tire is broken away from the flange 19 which, as shown in Fig. 3, may be a detachable flange on the type of wheel 16 shown in said figure. When using a wheel of this type a flange clamp may be used, such for instance as a clamp shown in any of the Figs. 3, 13, 14, and 15, so as to prevent the demountable flange 19 from following the bead of the tire as the tool 62 is pressed further downwardly in stripping the tire from the wheel 16. With this machine it will be readily seen that the toe portion 77 of the stripping tool 62 can be readily made to follow the outer face of the surface of the wheel rim 16 and closely follow the face of the flange and wheel, thus effectively breaking and removing any rust which may accumulate thereon, by the helical path of movement of the said plug 81. The height or thickness of the plug 81 is such, however, as not to cause the tool 61 to catch in the peripheral inflation valve aperture which usually passes through the outer periphery of the wheel 16, for inflating the inner tube 18. After this particular bead of the tire 17 has been separated from the wheel rim 16, the flange clamp can be removed and the wheel 16 turned over, to be operated on in the same way substantially for the breaking of the other bead of the tire 17 away and the removal of the tire 17 from the rim.

In case a drop center wheel rim 100 is being operated upon, as shown for instance in Fig. 20, in removing the tire 17, the stripping tool 62 may be used, if desired, so as to break the bead of the tire and move one bead thereof down into the well 101 of the wheel rim by moving the drive-bar 109 clockwise, after which the tire is turned over. A bead supporting block 116 is then applied, as shown in Fig. 20, and the other bead of the tire is similarly moved down into the well 101. Then, with the aid of a tire iron 97, the bead block 116 and the "off" portion 94 of the "on and off" tool 92, adjusted by loosening the wedge 60 and adjusting the position of the tool 62 so that it rests on the edge of the wheel rim even with the outer edge thereof and by moving said "off" portion 94 outwardly by the eccentric and moving the pin 111 to a different hole 112, one side of a bead of the tire is lifted over the adjacent flange of the wheel 100, by moving the drive-bar 109 counterclockwise, while the other side thereof is in the well 101, until this bead of the tire is removed from the wheel. Thereupon, the other bead of the tire 17 is removed in a similar fashion from the wheel without turning the wheel over. In mounting the tire 17 on the drop center rim 100 the beads of the tire are moved over the tire flange in succession in the reverse order by rotating the drive-bar 65 clockwise, with the "on" tool end 98 and the aid of the bead block 116 and a bead clamp 130, the lower tire bead being placed over the wheel rim first and then the upper bead.

It is, of course, desirable at all times to apply an ample amount of lubricant, as for example soapy water, to the face of the tire 17 being contacted by the working face of the particular tool, and this can be accomplished uniformly, when using a stripper tool 62, with the aid of the reservoir 84 and the adjustment of the position of the valve 87, 88 therein. However, after the tire is mounted in position any soapy water remaining on the tire should be washed off.

While I have described my invention above in detail I wish it to be understood that many changes may be made therein without departing from the spirit of the same.

I claim:

1. The combination comprising, a screw-threaded arbor, a base for the arbor, a support for a wheel having a detachable rim, on the base having means for preventing the wheel from turning on said base, a nut screw-threaded to the arbor, a tool, a tool holder support therefor laterally adjustable in the nut, a tool holder having an adjustable connection with said tool holder support, said tool holder being provided with a drive-bar for rotating the tool with regard to said wheel, and a clamp for engaging the edge of the wheel and detachable rim while having a tire associated therewith.

2. The combination comprising, a screw-threaded arbor, a base for the arbor, a support for a wheel having a detachable rim, on the base having means for preventing the wheel from turning on said base, a nut screw-threaded to the arbor, a tool, a tool holder support therefor located on the nut, a tool holder having an adjustable connection with said tool holder support, said tool holder being provided with a drive-bar for rotating the tool with regard to said wheel, and a detachable wheel flange clamp for engaging the edge of the wheel and detachable rim while having a tire associated therewith so as to clamp in position the detachable wheel flange at merely one point on the wheel.

HUGH M. ROCKWELL.

References Cited in the file of this patent

UNITED STATES PATENTS

| Number | Name | Date |
| --- | --- | --- |
| 793,412 | Bliss | June 27, 1905 |
| 1,208,184 | Mayer | Dec. 12, 1916 |
| 1,395,511 | Morgan | Nov. 1, 1921 |
| 1,441,464 | Watson | Jan. 9, 1923 |
| 1,480,371 | Cattoni | Jan. 8, 1924 |
| 1,493,983 | Hurley | May 13, 1924 |
| 1,616,362 | Gagnon | Feb. 1, 1927 |
| 1,656,964 | Turner | Jan. 24, 1928 |
| 1,720,615 | Welch | July 9, 1929 |
| 1,742,590 | Frewogel | Jan. 7, 1930 |
| 1,793,864 | Manley | Feb. 24, 1931 |
| 2,201,982 | Bazarek | May 28, 1940 |
| 2,378,955 | Teegarden | June 26, 1945 |
| 2,471,642 | Moltz | May 31, 1949 |
| 2,479,432 | Tillotson | Aug. 16, 1949 |
| 2,489,088 | Hewitt | Nov. 22, 1949 |
| 2,512,864 | Koester | June 27, 1950 |
| 2,547,976 | Rockwell | Apr. 10, 1951 |

FOREIGN PATENTS

| Number | Country | Date |
| --- | --- | --- |
| 765,192 | France | Mar. 19, 1934 |
| 578,761 | Great Britain | July 10, 1946 |
| 258,165 | Switzerland | Apr. 16, 1949 |